United States Patent [19]

Schack et al.

[11] 4,012,492

[45] Mar. 15, 1977

[54] SYNTHESIS OF ANHYDROUS METAL PERCHLORATES

[75] Inventors: Carl J. Schack, Chatsworth; Donald Pilipovich, Agoura, both of Calif.

[73] Assignee: The United States of America as represented by the Secretary of the Navy, Washington, D.C.

[22] Filed: June 10, 1975

[21] Appl. No.: 585,549

[52] U.S. Cl. .............................. 423/472; 423/476; 423/500

[51] Int. Cl.² .................. C01B 7/02; C01B 11/00; C01G 23/00; C01G 37/00; C01G 31/00

[58] Field of Search .................. 423/476, 472, 500

[56] References Cited

UNITED STATES PATENTS

| | | | |
|---|---|---|---|
| 3,075,827 | 1/1963 | Cretzmeyer | 423/476 |
| 3,102,784 | 9/1963 | Gale | 423/476 |
| 3,151,935 | 10/1964 | Hoekje et al. | 423/476 X |
| 3,157,464 | 11/1964 | Laran | 423/476 |
| 3,615,179 | 10/1971 | Rosenberg | 423/476 |
| 3,694,172 | 9/1972 | Schack et al. | 423/472 X |
| 3,873,677 | 3/1975 | Christe et al. | 423/472 X |
| 3,922,336 | 11/1975 | Christe et al. | 423/500 X |

*Primary Examiner*—Edward Stern
*Attorney, Agent, or Firm*—R. S. Sciascia; Philip Schneider; Thomas McDonnell

[57] ABSTRACT

Preparation of titanium tetraperchlorate, vanadium perchlorate, and chromyl perchlorate by the reactions of chlorine perchlorate with the respective anhydrous metal chlorides at a temperature from about −45° C to about 20° C. These perchlorates are useful in compounding gas generating compositions.

5 Claims, No Drawings

SYNTHESIS OF ANHYDROUS METAL PERCHLORATES

BACKGROUND OF THE INVENTION

1. Field of the Invention

The invention pertains to the preparation of inorganic oxidizing salts and in particular to the preparation of anhydrous metal perchlorates.

2. Prior Art

Syntheses of anhydrous metal perchlorates have been restricted mainly to metals from Groups I and II. A few preparations have been reported for transition metal perchlorates as well as $NO_2^+$ and $NH_4^+$ complex perchlorates.

One method is known for the preparation of anhydrous titanium tetraperchlorate. This method proceeds by the reaction of anhydrous perchloric acid with anhydrous titanium tetrachloride. However the product is not pure as is evidenced by the data presented pertaining to the melting point, analysis, stability, yield, and polycrystalline form. A major disadvantage of the impurities in the product is the necessity of refrigeration. Other disadvantages of this synthesis are the scarcity, expense, and danger of anhydrous perchloric acid.

The known method for the preparation of chromyl perchlorate is through the reaction of chromyl chloride and dichlorine hexoxide. Although the reaction product is pure, the synthesis has the disadvantages which result from the scarcity, expense, and danger of anhydrous dichlorine hexoxide.

SUMMARY OF THE INVENTION

It is, therefore, an object of this invention to form anhydrous metal perchlorates safely, quickly, and inexpensively.

Another object of this invention is to form anhydrous metal perchlorates in a high degree of purity.

These and other objects are achieved by a method which proceeds by the following reactions:

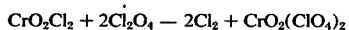

$$CrO_2Cl_2 + 2Cl_2O_4 \rightarrow 2Cl_2 + CrO_2(ClO_4)_2$$

$$TiCl_4 + 4Cl_2O_4 \rightarrow 4Cl_2 + Ti(ClO_4)_4$$

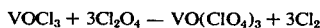

$$VOCl_3 + 3Cl_2O_4 \rightarrow VO(ClO_4)_3 + 3Cl_2$$

and which occur at a temperature from $-45°$ C to $20°$ C.

DETAILED DESCRIPTION OF THE INVENTION

Due to the strong oxidizing strength of the perchlorate group the method of the invention must proceed in vessels constructed from stainless steel, platinum, teflon, monel or similar non-oxidizable materials or coated therewith. The reaction is carried out at ambient pressure and at a temperature from about $-45°$ C to about $20°$ C but preferably from $-25°$ C to $0°$ C. Stirring is optional because the bubbling of the by-product chlorine through the reaction solution provides sufficient agitation. Completion of the reaction is determined preferably by monitoring the chlorine gas by-product. Generally the reaction is complete within 4 to 6 hours and the perchlorate product may then be collected.

Preferably, chlorine perchlorate is prepared by the method disclosed in U.S. Pat. No. 3,694,172 by Schack et al.

The reactants are added in stoichiometric amounts. Thus for the synthesis of chromyl perchlorate the reactants are added in a $CrO_2Cl_2$-to-$Cl_2O_4$ mole ratio of 1:2. For the synthesis of vanadium perchlorate, the reactants are added in a $VOCl_3$-to-$Cl_2O_4$ mole ratio of 1:3. It is preferred that an extra 5 to 10 mole percent of $Cl_2O_4$ is added in order to decrease the reaction time. Since water produces impurities in the perchlorate product, the reactants and the system should be anhydrous.

The reactants may be added in any order or in any rate. However the reactions are exothermic; so, measures must be taken to ensure that reaction temperature does not exceed about 20° C. According to a preferred embodiment of this invention the reactants are added to the reaction vessel in the solid state, thereby minimizing the vapors of the reactants.

This embodiment is utilized in Example I given hereinafter. It is understood that the examples are given by way of illustration and are not intended to limit the disclosure or the claims to follow in any way.

EXAMPLE I

Titanium tetrachloride (1.22 mmol) and $ClOClO_3$ (6.01 mmol) were combined at $-196°$ in a 75 ml stainless steel cylinder and then gradually warmed to $-25°$. After several days, recooling to $-196°$ showed no non-condensable gases were present. The contents of the reactor were separated by fractional condensation in a series of U-traps cooled to $-78°$, $-112°$, and $-196°$. Nothing was trapped at $-78°$ while the $-112°$ fraction consisted solely of unreacted $Cl_2O_4$ (1.17 mmol), and the $-196°$ fraction was $Cl_2$ (4.88 mmol). The pale yellow solid residue left in the reactor weighed 0.525 g. The weight calculated for 1.22 mmol of $Ti(ClO_4)_4$ was 0.544 g and therefore the yield of $Ti(ClO_4)$ was 97 percent. Vacuum sublimation of the $Ti(ClO_4)_4$ was carried out in a Pyrex apparatus at 50°–60° using a $-78°$ cold finger. The sublimed material was nearly colorless and had a m.p. with dec. of 101°–2°. Almost no residue remained unsublimed. Anal. Calcd. for $Ti(ClO_4)_4$: Ti, 10.75; $ClO_4$, 89.25. Found: Ti, 10.8; $ClO_4$, 87.9. A sample of $Ti(ClO_4)_4$ (0.242 mmol) was heated in a stainless steel cylinder for 4 hours at 115° followed by 1.5 hr. at 190°. This produced $O_2$ (1.705 mmol), $Cl_2$ (0.481 mmol), and a white solid residue of $TiO_2$ (0.241 mmol). All temperatures are in degrees Centigrade.

EXAMPLE II

Chromyl chloride (1.41 mmol) and $ClOClO_3$ (3.16 mmol) were reacted at $-45°$ for several days in a stainless steel cylinder. After separation and identification, the volatile products found were $CrO_2F_2$ (0.18 mmol), $Cl_2$ (2.59 mmol), and $Cl_2O_4$ (0.66 mmol). The $CrO_2(ClO_4)_2$ (1.23 mmol) remained in the cylinder. The $CrO_2F_2$ probably arose through reaction of $CrO_2Cl_2$ with the $ClF_3$ passivated metal surfaces in the reactor and/or vacuum line during transfers. Anal., Calcd. for $CrO_2(ClO_4)_2$: $ClO_4$, 70.3. Found: $ClO_4$, 69.6. A sample of $CrO_2(ClO_4)_2$ (0.65 mmol) was pyrolyzed for 15 hrs at 110° producing $Cl_2$ (0.66 mmol), $O_2$ (2.21 mmol) and $CrO_3$ (0.65 mmol), m.p. 195°–7°, lit. 196°. All temperatures are in degrees Centigrade.

As can be seen from the examples, the method of this invention produces a highly pure anhydrous metal perchlorate without the use of the scarce and dangerous anhydrous perchloric acid or dichlorine hexoxide. The anhydrous titanium perchlorate has been stored at room temperature for over three months without degradation.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of preparing an anhydrous metal perchlorate which comprises admixing for at least 4 hours at a temperature from −45° C to 20° C an anhydrous metal chloride selected from the class consisting of titanium tetrachloride, chromyl chloride, and vanadium oxytrichloride with chlorine perchlorate in a metal chloride-to-chlorine perchlorate mole ratio which is 1:4 if titanium tetrachloride is selected, or is 1:2 if chromyl chloride is selected, or is 1:3 if vanadium oxytrichloride is selected, and recovering said anhydrous metal perchlorate.

2. A method of preparing an anhydrous metal perchlorate which comprises admixing for at least 4 hours at a temperature from −45° C to 20° C an anhydrous metal chloride selected from the class consisting of titanium tetrachloride, chromyl chloride, and vanadium oxytrichloride with chlorine perchlorate in a metal chloride-to-chlorine perchlorate mole ratio which is from 1:4.2 to 1:4.4 if titanium tetrachloride is selected, or is from 1:2.1 to 1:2.2 if chromyl chloride is selected, or is from 1:3.15 to 1:3.3 if vanadium oxytrichloride is selected, and recovering said anhydrous metal perchlorate.

3. The method of claim 2 wherein said anhydrous metal chloride is titanium chloride.

4. The method of claim 2 wherein said anhydrous metal chloride is chromyl chloride.

5. The method of claim 2 wherein said anhydrous metal chloride is vanadium oxytrichloride.

* * * * *